US010393257B2

(12) United States Patent
Fujiwara et al.

(10) Patent No.: US 10,393,257 B2
(45) Date of Patent: Aug. 27, 2019

(54) CONTROL APPARATUS FOR AUTOMATIC TRANSMISSION AND CONTROL METHOD FOR AUTOMATIC TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Sadamu Fujiwara, Yokohama (JP); Hideharu Yamamoto, Odawara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 71 days.

(21) Appl. No.: 15/548,838

(22) PCT Filed: Jan. 12, 2016

(86) PCT No.: PCT/JP2016/050635
§ 371 (c)(1),
(2) Date: Aug. 4, 2017

(87) PCT Pub. No.: WO2016/125538
PCT Pub. Date: Aug. 11, 2016

(65) Prior Publication Data
US 2018/0023699 A1 Jan. 25, 2018

(30) Foreign Application Priority Data
Feb. 5, 2015 (JP) ................................ 2015-021477

(51) Int. Cl.
*F16H 61/12* (2010.01)
*F16H 61/00* (2006.01)
(Continued)

(52) U.S. Cl.
CPC ......... *F16H 61/12* (2013.01); *F16H 61/0021* (2013.01); *F16H 61/0437* (2013.01);
(Continued)

(58) Field of Classification Search
CPC ................ F16H 61/12; F16H 61/0021; F16H 2061/1208; F16H 2061/1232; F16H 2061/126; F16H 2061/1264; F16H 2061/1268; F16H 2061/0488; F16H 2059/6807
See application file for complete search history.

(56) References Cited

U.S. PATENT DOCUMENTS 5,409,434 A * 4/1995 Furukawa ........... F16H 61/0206
477/130

FOREIGN PATENT DOCUMENTS

JP 2009-221986 A 10/2009

* cited by examiner

*Primary Examiner* — Erin D Bishop
(74) *Attorney, Agent, or Firm* — Foley & Lardner LLP

(57) ABSTRACT

A control apparatus includes a select lever, an inhibitor switch, a manual valve, a first SOL, a second SOL, and a controller. The controller controls the first SOL and the second SOL such that a hydraulic pressure is supplied to a first friction element and a second friction element when the inhibitor switch detects a D range. The controller determines that an operation position is at an intermediate position when operations of the first friction element and the second friction element are not detected. The controller determines that the first SOL has a failure when the operation of the first friction element is not detected.

7 Claims, 10 Drawing Sheets

(51) Int. Cl.
*F16H 61/04* (2006.01)
*F16H 59/68* (2006.01)

(52) U.S. Cl.
CPC ...... *F16H 59/68* (2013.01); *F16H 2059/6807* (2013.01); *F16H 2061/0488* (2013.01); *F16H 2061/126* (2013.01); *F16H 2061/1208* (2013.01); *F16H 2061/1232* (2013.01); *F16H 2061/1268* (2013.01); *F16H 2312/02* (2013.01)

CONTROL APPARATUS FOR AUTOMATIC TRANSMISSION AND CONTROL METHOD FOR AUTOMATIC TRANSMISSION

TECHNICAL FIELD

The present invention relates to a control apparatus for automatic transmission and a control method for automatic transmission.

BACKGROUND ART

There has been known an automatic transmission that includes a manual valve driven according to an operation of a select lever at an oil passage, and the oil passage couples a hydraulic pressure supply source and a plurality of forward movement friction elements. Such automatic transmission possibly causes a mismatch of a range (hereinafter referred to as a pseudo D) where a driving position of the manual valve is not at a traveling range position even if a signal from an inhibitor switch, which detects a selected range, is a signal for traveling range.

In this case, since the driving position of the manual valve is not at the traveling range position, a hydraulic pressure is not supplied to the friction element requiring an engagement for forward movement. However, even in this case, a hydraulic pressure control according to the traveling range is executed on the basis of the signal from the inhibitor switch. This results in a difference between a hydraulic pressure instruction value to engage the friction element and an actual hydraulic pressure.

Driving the manual valve to an appropriate position, namely, the traveling range position, with the difference between the hydraulic pressure instruction value and the actual hydraulic pressure rapidly increases the actual hydraulic pressure so as to be the hydraulic pressure instruction value. The rapid engagement of the friction element results in providing an evil shock to a driver.

JP2009-221986A discloses a technique that restricts an output from an engine when a pseudo D state continues for a predetermined time, and the output is input to a transmission.

SUMMARY OF INVENTION

A cause that generates a delay of an engagement in friction element at a detection of a traveling range is possibly a failure in a hydraulic pressure controller such as a solenoid valve, which controls a supplied hydraulic pressure to the friction element, except for a pseudo D state.

However, the pseudo D state is not solved until operating a select lever thereafter to drive a manual valve to an appropriate position. In other words, it is necessary to wait for the operation of the select lever to solve the pseudo D state.

Focusing on such feature, when a state where the friction element is not engaged at the detection of the traveling range sufficiently passes, the cause is regarded as not the pseudo D state and a failure in the hydraulic pressure controller is detected. This consequently involves a long determination period, possibly resulting in an interference of a smooth start of moving of a vehicle.

The present invention has been made in view of such technical problem, and it is an object of the present invention to provide a control apparatus for automatic transmission and a control method for automatic transmission that ensure an early detection of a cause of a delay of engagement of a friction element at a detection of a traveling range.

A control apparatus for automatic transmission according to a certain aspect of the present invention includes an operating unit used to select a range of an automatic transmission including a traveling range and a non-traveling range, a detecting unit configured to detect the selected range by the operating unit, a valve disposed at an oil passage that couples a hydraulic pressure supply source and a plurality of forward movement friction elements, a supply of a hydraulic pressure from the hydraulic pressure supply source to the plurality of forward movement friction elements being allowed while the traveling range is selected, the valve being configured to drive according to an operation of the operating unit, and a hydraulic pressure controller disposed at the oil passage, the hydraulic pressure controller being configured to control the supplied hydraulic pressure to the plurality of forward movement friction elements. The control apparatus for automatic transmission according to this aspect further includes a control unit configured such that if the detecting unit detects the traveling range, the control unit controls the hydraulic pressure controller to supply the plurality of forward movement friction elements with the hydraulic pressure, and a determining unit configured such that if the detecting unit detects the traveling range, the determining unit executes a determination. The determining unit is configured such that if operations of all the friction elements of the plurality of forward movement friction elements are not detected, the determining unit determines that an operation position of the operating unit is at an intermediate position between a position according to the traveling range and a position according to the non-traveling range. The determining unit is configured such that if the operation of a part of the friction elements among the plurality of forward movement friction elements is not detected, the determining unit determines that the hydraulic pressure controller has a failure.

According to another aspect of the present invention, a control method for automatic transmission is provided which includes providing an operating unit, a detecting unit, a valve, and a hydraulic pressure controller, the operating unit being used to select a range of an automatic transmission including a traveling range and a non-traveling range, the detecting unit being configured to detect the selected range by the operating unit, the valve being disposed at an oil passage that couples a hydraulic pressure supply source and a plurality of forward movement friction elements, a supply of a hydraulic pressure from the hydraulic pressure supply source to the plurality of forward movement friction elements being allowed while the traveling range is selected, the valve being configured to drive according to an operation of the operating unit, the hydraulic pressure controller being disposed at the oil passage, the hydraulic pressure controller being configured to control the supplied hydraulic pressure to the plurality of forward movement friction elements, controlling the detecting unit such that if the detecting unit detects the traveling range, the hydraulic pressure controller supplies the plurality of forward movement friction elements with the hydraulic pressure, and determining that an operation position of the operating unit is at an intermediate position between a position according to the traveling range and a position according to the non-traveling range if the detecting unit detects the traveling range and operations of all the friction elements of the plurality of forward movement friction elements are not detected, and determining that the hydraulic pressure controller has a failure if the detecting unit detects the traveling range and the operation of a part of the friction elements among the plurality of forward movement friction elements is not detected.

With these aspects, the determination is executed on the basis of the operating state of the plurality of forward movement friction elements, which differs depending on the cause of the delay of engagement at the detection of the traveling range, thereby ensuring the early detection of the cause of the delay of engagement.

DESCRIPTION OF EMBODIMENTS

The following describes an embodiment of the present invention with reference to the accompanying drawings.

First Embodiment

Figure 1:
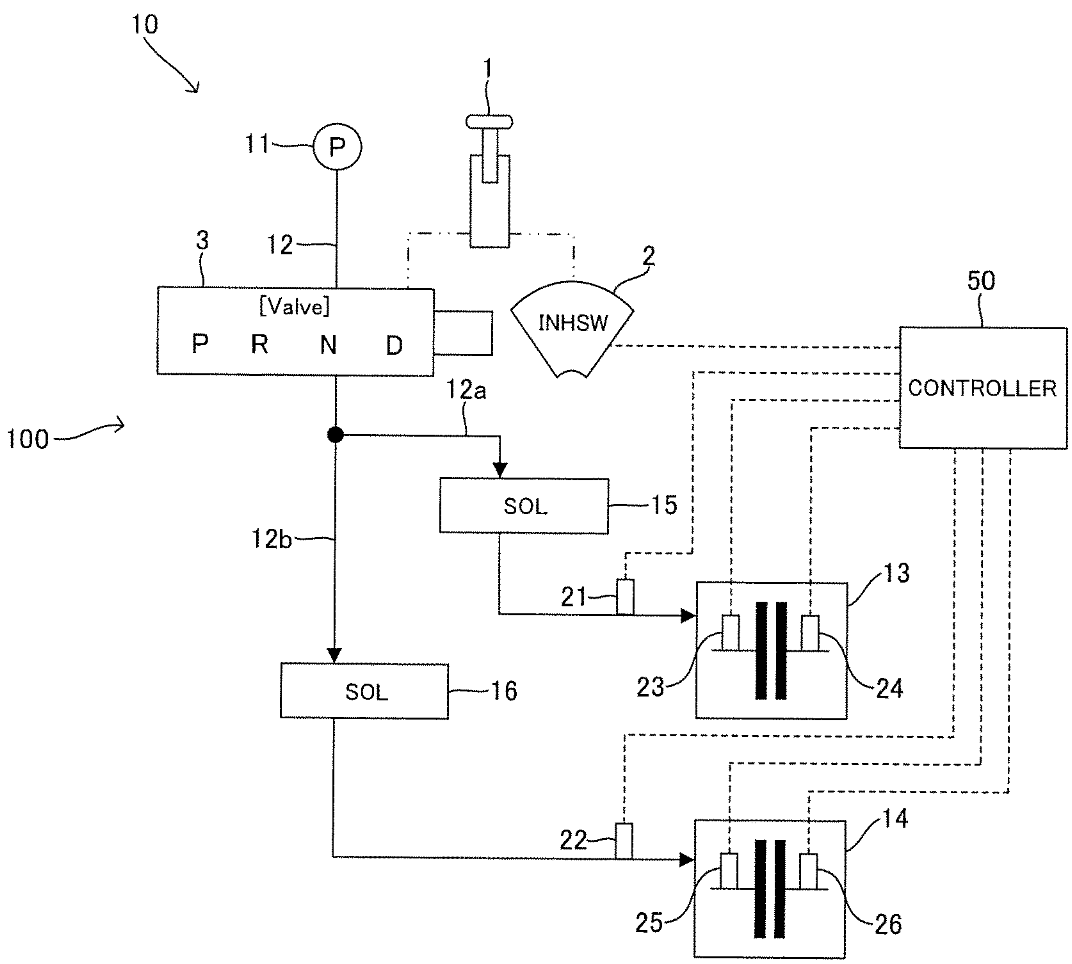
FIG. 1 is a drawing illustrating a main portion of a vehicle including a control apparatus for automatic transmission according to a first embodiment.

FIG. 1 is a drawing illustrating a main portion of a vehicle including a control apparatus for automatic transmission 100 (hereinafter simply referred to as a control apparatus 100) according to the embodiment. The control apparatus 100 is mounted to the vehicle together with an automatic transmission 10.

The automatic transmission 10 includes an oil pump 11, an oil passage 12, a first friction element 13, a second friction element 14, a first solenoid valve 15, and a second solenoid valve 16. In this embodiment, the automatic transmission 10 is a CVT, namely, a continuously variable transmission. The following refers to a solenoid valve as a SOL.

The oil passage 12 couples the oil pump 11, the first friction element 13, and the second friction element 14. The oil passage 12 branches to the first friction element 13 and the second friction element 14 for the coupling. A first branch oil passage 12*a* is an oil passage of a part of the oil passage 12 branched and coupled to the first friction element 13. A second branch oil passage 12*b* is an oil passage of a part of the oil passage 12 branched and coupled to the second friction element 14.

Both the first friction element 13 and the second friction element 14 are forward movement friction elements corresponding to traveling ranges of the automatic transmission 10 and operate according to a hydraulic pressure. The first friction element 13 is the friction element used for a start of moving during normal while the second friction element 14 is the friction element that transmits a rotation at a gear ratio higher than the first friction element 13. In this embodiment, the first friction element 13 and the second friction element 14 constitute a stepwise sub-transmission mechanism disposed in series in a power transmission path relative to the continuously variable transmission mechanism of the automatic transmission 10.

The first SOL 15 and the second SOL 16 are disposed at the oil passage 12. Specifically, the first SOL 15 is disposed at the first branch oil passage 12*a*, and the second SOL 16 is disposed at the second branch oil passage 12*b*. The first SOL 15 and the second SOL 16 control the hydraulic pressure supplied from the oil pump 11 to the first friction element 13 and the second friction element 14. Specifically, the first SOL 15 controls the hydraulic pressure supplied to the first friction element 13, and the second SOL 16 controls the hydraulic pressure supplied to the second friction element 14. The first SOL 15 and the second SOL 16 are shared by the automatic transmission 10 and the control apparatus 100.

The control apparatus 100 includes a select lever 1, an inhibitor switch 2, a manual valve 3, and a controller 50 in addition to the first SOL 15 and the second SOL 16.

The select lever 1 is used to select the range of the automatic transmission 10. The range of the automatic transmission 10 includes a traveling range and non-traveling ranges. The traveling range is a D range, namely, a drive range, and the non-traveling ranges are a P range, namely, a parking range and an N range, namely, a neutral range. Besides, the ranges of the automatic transmission 10 include an R range, namely, a reverse range.

The inhibitor switch 2 detects the selected range by the select lever 1. The inhibitor switch 2 detects the selected range by a detection of a position of the select lever 1 to output a signal according to the detected selected range.

The manual valve 3 drives according to the operation of the select lever 1. The select lever 1 is coupled to the manual valve 3 via a link mechanism. The manual valve 3 is disposed at the oil passage 12. The manual valve 3 is disposed upstream with respect to the first SOL 15 and the second SOL 16 at the oil passage 12.

The manual valve 3 opens when the selected range is at the traveling range and closes when the selected range is at the non-traveling range. The hydraulic pressure is supplied to the manual valve 3 from the oil pump 11 via a pressure regulating valve (not illustrated).

The controller 50 is an electronic control device and the following signals are input to the controller 50. For example, the signal from the inhibitor switch 2 is input to the controller 50. A signal from a first hydraulic pressure sensor 21 to detect the supplied hydraulic pressure to the first friction element 13 and a signal from a second hydraulic pressure sensor 22 to detect the supplied hydraulic pressure to the second friction element 14 are input.

The first SOL 15 controls the supplied hydraulic pressure to the first friction element 13, and the second SOL 16 controls the supplied hydraulic pressure to the second friction element 14. In view of this, the first hydraulic pressure sensor 21 is disposed between the first SOL 15 and the first friction element 13 at the first branch oil passage 12*a*. The second hydraulic pressure sensor 22 is disposed between the second SOL 16 and the second friction element 14 at the second branch oil passage 12*b*.

Besides, to the controller 50, signals from a first input side rotation sensor 23, which detects an input side rotation of the first friction element 13, and from a first output side rotation sensor 24, which detects a output side rotation of the first friction element 13, are input. Signals from a second input side rotation sensor 25, which detects an input side rotation of the second friction element 14, and from a second output side rotation sensor 26, which detects an output side rotation of the second friction element 14, are also input. The first input side rotation sensor 23 and the second input side rotation sensor 25 may be constituted of a shared rotation sensor. The same applies to the first output side rotation sensor 24 and the second output side rotation sensor 26.

If a delay of engagement occurs in the first friction element 13 to be engaged at the detection of the traveling range, the controller 50 executes a control described next on the basis of these signals to detect a cause of the delay of engagement.

Figure 2:
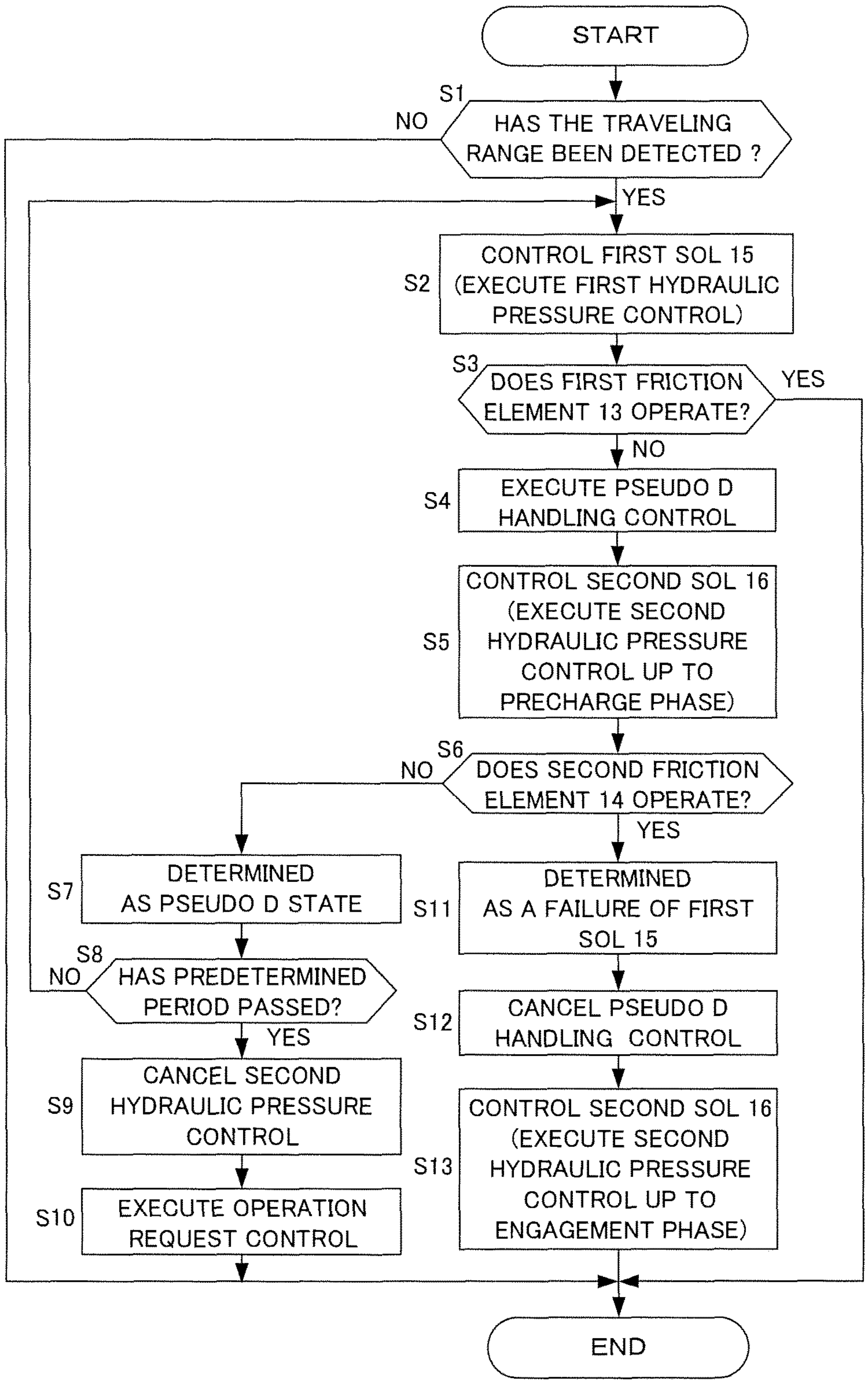
FIG. 2 is a drawing of a flowchart showing an example of a control executed in the first embodiment.

FIG. 2 is a drawing of a flowchart illustrating an example of a control executed in this embodiment. At Step S1, the controller 50 determines whether the inhibitor switch 2 has detected the traveling range. Whether the inhibitor switch 2 has detected the traveling range can be determined on the basis of the output from the inhibitor switch 2. When the negative determination is executed at Step S1, processes of this flowchart are once terminated.

When the positive determination is executed at Step S1, the controller 50 controls the first SOL 15 so as to supply the first friction element 13 with the hydraulic pressure at Step S2. At Step S2, the controller 50 specifically executes a first hydraulic pressure control that controls the supplied hydraulic pressure to the first friction element 13. The first hydraulic pressure control controls the first SOL 15 such that the supplied hydraulic pressure to the first friction element 13 becomes a hydraulic pressure instruction value LB'.

The hydraulic pressure instruction value LB' is a first hydraulic pressure instruction value to which an instruction value of the supplied hydraulic pressure to the first friction element 13 at the start of moving is set. The hydraulic pressure instruction value LB' is set to a value fitted to the start of moving by the first friction element 13 through, for example, an experiment. The hydraulic pressure instruction value LB' is specifically constituted of an instruction value at a precharge phase to reduce an invalid stroke, an instruction value at an engagement progress phase to promote synchronization, and an instruction value at an engagement phase to complete the engagement.

The first hydraulic pressure control sequentially changes the hydraulic pressure instruction value LB' to the instruction value at the precharge phase, the instruction value at the engagement progress phase, and the instruction value at the engagement phase in accordance with a predetermined procedure to control the first SOL 15. At and after Step S2, changing the hydraulic pressure instruction value LB' controls the first SOL 15.

At Step S3, the controller 50 determines whether the first friction element 13 has been operated. Whether the first friction element 13 has been operated can be determined by whether the supplied hydraulic pressure to the first friction element 13 has been increased on the basis of the signal from the first hydraulic pressure sensor 21. At Step S3, the determination whether the first friction element 13 has been operated detects the operation of the first friction element 13.

The positive determination at Step S3 means that the operation of the first friction element 13 has been detected. Accordingly, it can be determined that the first friction element 13 is normal. In this case, the processes of this flowchart are terminated.

The negative determination at Step S3 means that the operation of the first friction element 13 is not detected. Accordingly, it can be determined that the delay of engagement occurs in the first friction element 13. In this case, the process proceeds to Step S4, and the controller 50 executes a pseudo D handling control described next.

Figure 3:
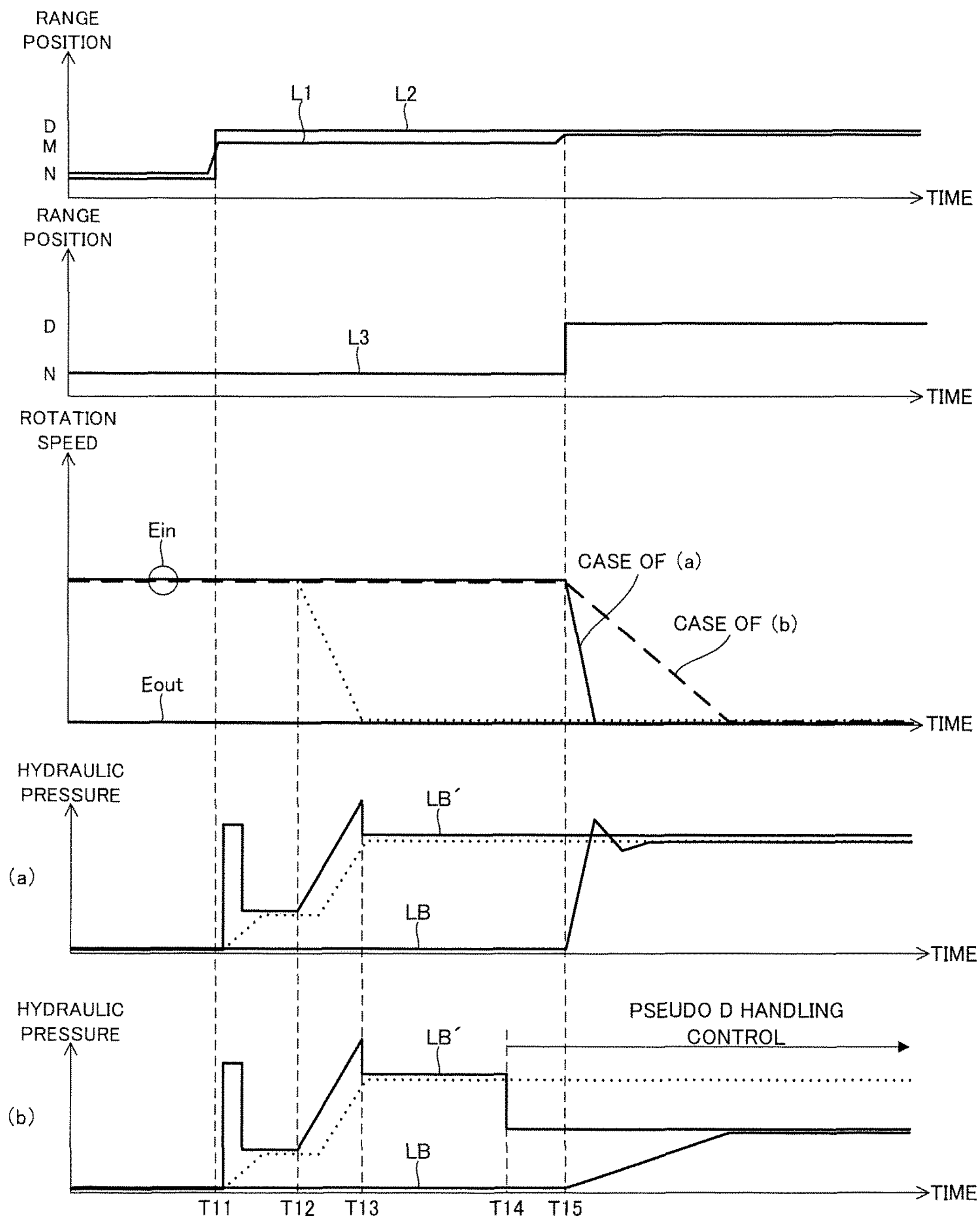
FIG. 3 is a first explanatory view for a pseudo D handling control.
Figure 4:
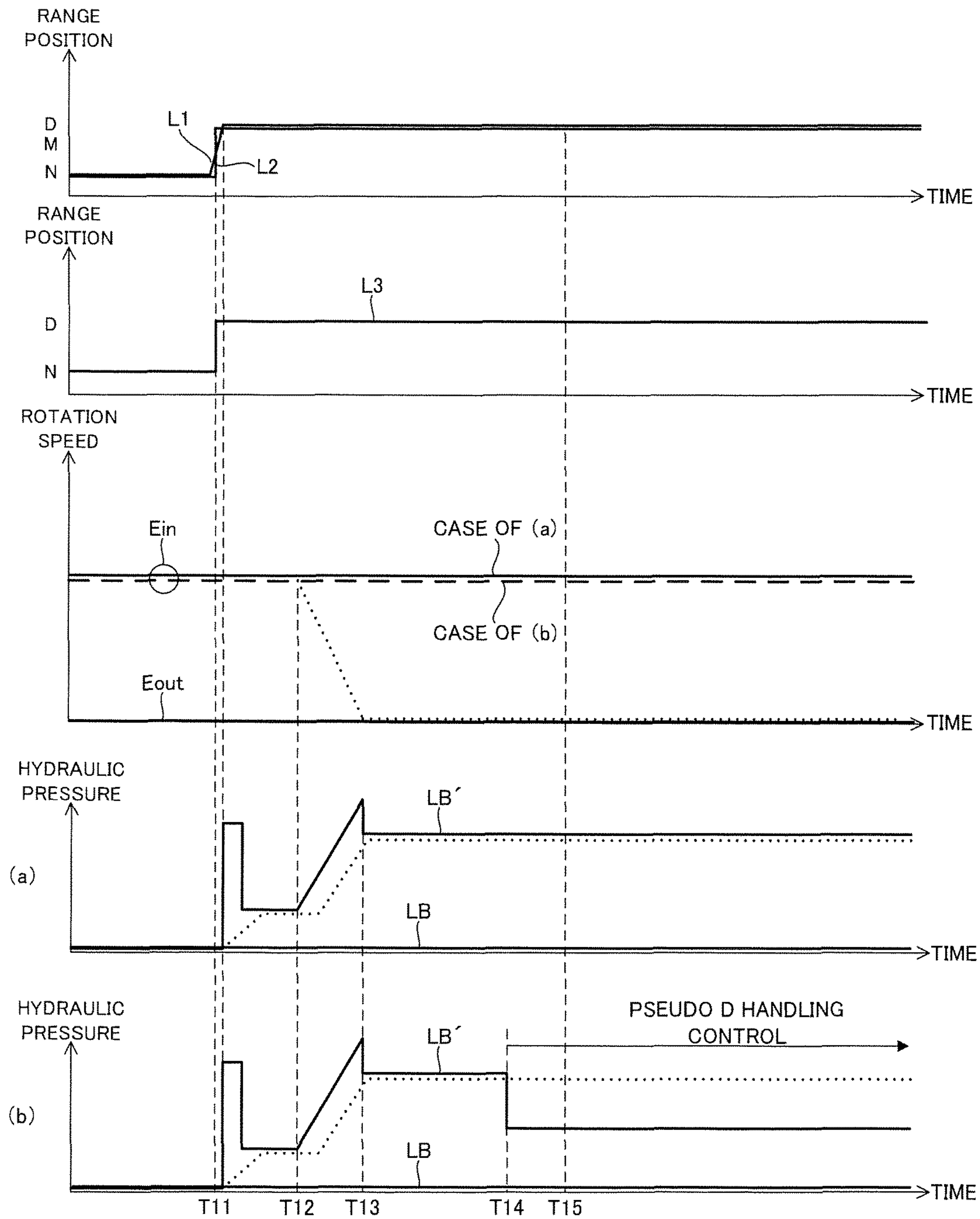
FIG. 4 is a second explanatory view for the pseudo D handling control.

FIG. 3 and FIG. 4 are explanatory views for the pseudo D handling control. FIG. 3 illustrates a case where the cause of the delay of engagement of the first friction element 13 is the pseudo D state. FIG. 4 illustrates a case where the cause of the delay of engagement of the first friction element 13 is a failure in the first SOL 15.

A lever operation position L1 shows an operation position of the select lever 1. A detecting position L2 shows a detecting position of the inhibitor switch 2. A valve driving position L3 shows a driving position of the manual valve 3. A converted input side rotation speed Ein shows a rotation speed where an input side rotation speed of the first friction element 13 is converted into a rotation speed equivalent to an output side rotation speed using gear ratio. An output side rotation speed Eout shows the output side rotation speed of the first friction element 13. An actual hydraulic pressure LB shows an actual hydraulic pressure of the supplied hydraulic pressure to the first friction element 13.

In FIG. 3 and FIG. 4, (a) and (b) both show changes in the actual hydraulic pressure LB and the hydraulic pressure instruction value LB'. (a) shows the change in the case where the pseudo D handling control is not executed. (b) shows the change in the case where the pseudo D handling control is executed. In FIG. 3 and FIG. 4, the lever operation position L1, the detecting position L2, and the valve driving position L3 are shown by a range position, that is, a position according to the range.

The following describes FIG. 3 first. While the driver operates the select lever 1 from the N range position to the D range position, the lever operation position L1 becomes an intermediate position M between the N range position and the D range position at a timing T11.

At this time, the valve driving position L3 does not become the D range position but remains at the N range position. In other words, the valve driving position L3 does not become a valve open positon of the manual valve 3 and remains at a valve close position. In view of this, the manual valve 3 remains close at this time.

However, in this case as well, the detecting position L2 changes from the N range position to the D range position. This is because that a relationship between the detecting position L2 and the valve driving position L3 is configured as follows considering safety.

Figure 5:
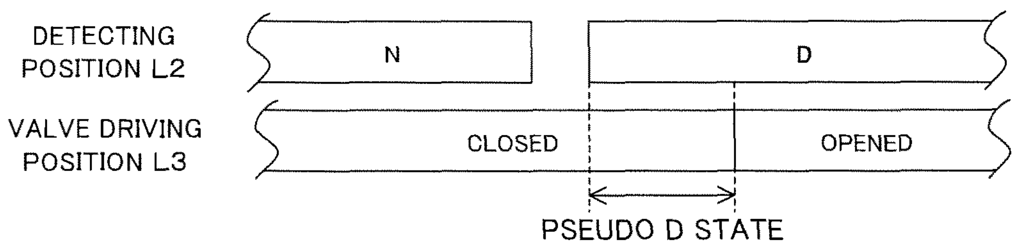
FIG. 5 is a drawing illustrating a relationship between a detection range position and a valve driving position.

FIG. 5 is a drawing illustrating the relationship between the detection range position L2 and the valve driving position L3. With the detecting position L2 at the N range position, the detecting position L2 and the valve driving position L3 are configured such that the valve driving position L3 does not become the valve open positon.

This ensures preventing a situation where the vehicle starts moving while the N range is selected due to a variation of the detecting position L2 and the valve driving position L3. Instead of thus considering the safety, depending on the operation of the select lever 1, even if the detecting position L2 is at the D range position, the valve driving position L3 becomes the valve close position, causing the pseudo D state.

Referring again to FIG. 3, with the detecting position L2 at the D range position at the timing T11, the first hydraulic pressure control starts and the hydraulic pressure instruction value LB' increases. The hydraulic pressure instruction value LB' is set to the hydraulic pressure instruction value at the precharge phase between the timing T11 and a timing T12, the hydraulic pressure instruction value at the engagement progress phase between the timing T12 and a timing T13, and the hydraulic pressure instruction value at the engagement phase from the timing T13 by the first hydraulic pressure control, respectively.

During the normal, the actual hydraulic pressure changes as indicated by the dotted line according to the hydraulic pressure instruction value LB' at and after the timing T11. During the normal, the converted input side rotation speed Ein changes as indicated by the dotted line at and after the timing T12.

However, in both cases of (a) and (b), the actual hydraulic pressure LB does not increase according to the hydraulic pressure instruction value LB'. Accordingly, the first friction element 13 is not operated. This is because that the manual valve 3 is closed. The fact that the first friction element 13 is not operated is also seen from that the converted input side rotation speed Ein does not attempt to synchronize with the output side rotation speed Eout from the timing T12.

In the case of (a) where the pseudo D handling control is not executed, the hydraulic pressure instruction value LB' remains the same at and after the timing T13. With this state, the lever operation position L1 and the valve driving position L3 become the D range position at a timing T15 by the lever operation by the driver. Consequently, the converted input side rotation speed Ein changes as indicated by the solid line, thus being synchronized with the output side rotation speed Eout at a rapid velocity compared with the velocity during the normal indicated by the dotted line. That is, the first friction element 13 is rapidly engaged.

In the case of (b) where the pseudo D handling control is executed, the pseudo D handling control is started at a timing T14. The pseudo D handling control lowers the hydraulic pressure instruction value LB' more than the hydraulic pressure instruction value at the engagement phase to handle the pseudo D. Specifically, the pseudo D handling control lowers the hydraulic pressure instruction value LB' down to a predetermined value. This predetermined value is preliminary settable on the basis of, for example, an experiment.

Accordingly, the converted input side rotation speed Ein changes as shown by the dashed line from the timing T15, thus being synchronized with the output side rotation speed Eout at a gradual velocity compared with the velocity during the normal indicated by the dotted line. That is, this reduces the rapid engagement of the first friction element 13.

In the case of FIG. 4, the lever operation position L1 is normally shifted from the N range position to the D range position. According to this, the detecting position L2 becomes the D range position at the timing T11. Consequently, similar to the case of FIG. 3, the first hydraulic pressure control is started.

Both the cases of (a) and (b), the actual hydraulic pressure LB does not increase according to the hydraulic pressure instruction value LB'. Accordingly, the first friction element 13 is not operated. However, in this example, the cause of the delay of engagement of the first friction element 13 is the failure in the first SOL 15, not the pseudo D state. Therefore, even if the pseudo D handling control is started at the timing T14, this cannot handle the delay of engagement of the first friction element 13.

In view of this, for appropriate handling of the delay of engagement of the first friction element 13, the early detection of the cause is necessary. The following further describes the control executed by the controller 50 for this with reference to FIG. 2.

The controller 50 controls the second SOL 16 so as to supply the second friction element 14 with the hydraulic pressure at Step S5. At Step S5, the controller 50 specifically executes a second hydraulic pressure control that controls the supplied hydraulic pressure to the second friction element 14. The second hydraulic pressure control controls the second SOL 16 such that the supplied hydraulic pressure to the second friction element 14 becomes a hydraulic pressure instruction value HC'.

The hydraulic pressure instruction value HC' is a second hydraulic pressure instruction value to which an instruction value of the supplied hydraulic pressure to the second friction element 14 at the start of moving is set. The hydraulic pressure instruction value HC' is set to a value fitted to the start of moving by the second friction element 14 through, for example, an experiment. The hydraulic pressure instruction value HC' is, similar to the hydraulic pressure instruction value LB', constituted of the instruction value at the precharge phase, the instruction value at the engagement progress phase, and the instruction value at the engagement phase.

At Step S5, as the second hydraulic pressure control, the hydraulic pressure control that applies the instruction value at the precharge phase to the hydraulic pressure instruction value HC' is executed. In other words, the hydraulic pressure control up to the precharge phase is executed as the second hydraulic pressure control. At and after Step S5, changing the hydraulic pressure instruction value HC' controls the second SOL 16.

At Step S6, the controller 50 determines whether the second friction element 14 has been operated. Whether the second friction element 14 has been operated can be determined by whether the supplied hydraulic pressure to the second friction element 14 has been increased on the basis of the signal from the second hydraulic pressure sensor 22. At Step S6, the determination whether the second friction element 14 has been operated detects the operation of the second friction element 14.

The negative determination at Step S6 means that the operation of the second friction element 14 is not detected. In this case, the process proceeds to Step S7 and the controller 50 determines the state as the pseudo D state. Accordingly, it is determined that the lever operation position L1 is at the intermediate position M. At this time, the controller 50 specifically determines that the valve driving position L3 is at the N range position, namely, the non-traveling range position from a result of the lever operation position L1 at the intermediate position M.

At Step S8, the controller 50 determines whether a predetermined period has passed. The predetermined period is an extension period to execute processes at Step S9 and Step S10 and is preliminary settable on the basis of, for example, an experiment. The negative determination at Step S8 returns the process to Step S2.

The positive determination at Step S8 means that the state is continuously determined as the pseudo D state until the predetermined period has passed. In this case, the controller 50 cancels the second hydraulic pressure control at Step S9. Specifically, the hydraulic pressure instruction value HC' is zeroed. At Step S10, an operation request control is executed. The operation request control is a control to promote the operation of the select lever 1 and is executable by lighting of a warning lamp and a similar operation. After Step S10, the processes of this flowchart are terminated.

The positive determination at Step S6 means that the operation of the second friction element 14 has been detected. In this case, the process proceeds to Step S11 and the controller 50 determines that the first SOL 15 has a failure. The controller 50 cancels the pseudo D handling control at Step S12. The controller 50 specifically zeroes the hydraulic pressure instruction value LB'.

At Step S13, the controller 50 controls the second SOL 16 such that the vehicle starts moving by the second friction element 14. Specifically, the controller 50 changes the hydraulic pressure instruction value HC' to the hydraulic pressure instruction value at the engagement progress phase and further the hydraulic pressure instruction value at the engagement phase. That is, the controller 50 executes the second hydraulic pressure control up to the engagement phase. Consequently, the second friction element 14 is engaged. After Step S13, the processes of this flowchart are terminated.

At Step S3, the controller 50 may determine whether the first friction element 13 has been operated by whether the input side rotation of the first friction element 13 is synchronized with the output side rotation. That is, the controller 50 may determine whether the first friction element 13 has been operated by whether the first friction element 13 has been engaged. Whether the first friction element 13 has been engaged can be determined on the basis of the signals from the first input side rotation sensor 23 and the first output side rotation sensor 24.

At Step S4, the controller 50 may restrict an input torque to the automatic transmission 10 together with the pseudo D handling control. This ensures further reducing a shock possibly occurring by solving this pseudo D state. The input torque to the automatic transmission 10 can be restricted by controlling the engine, which is the power source to generate the input torque, and can be released according to the cancel of the pseudo D handling control.

At Step S4, the controller 50 may cancel the first hydraulic pressure control instead of executing the pseudo D handling control. In this case, the simultaneous action of the hydraulic pressure to the first friction element 13 and the second friction element 14 ensures avoiding the automatic transmission 10 to be interlocked. Accordingly, the determination whether the second friction element 14 has been engaged on the basis of the signals from the second input side rotation sensor 25 and the second output side rotation sensor 26 also allows the determination whether the second friction element 14 has been operated.

At Step S9, the controller 50 may change the friction element that executes a control for start of moving from the first friction element 13 to the second friction element 14 instead of canceling the second hydraulic pressure control. The friction element change is executable by processes similar to the processes at Step S12 and Step S13. In this case, the controller 50 may not execute the operation request control at Step S10.

Figure 6:
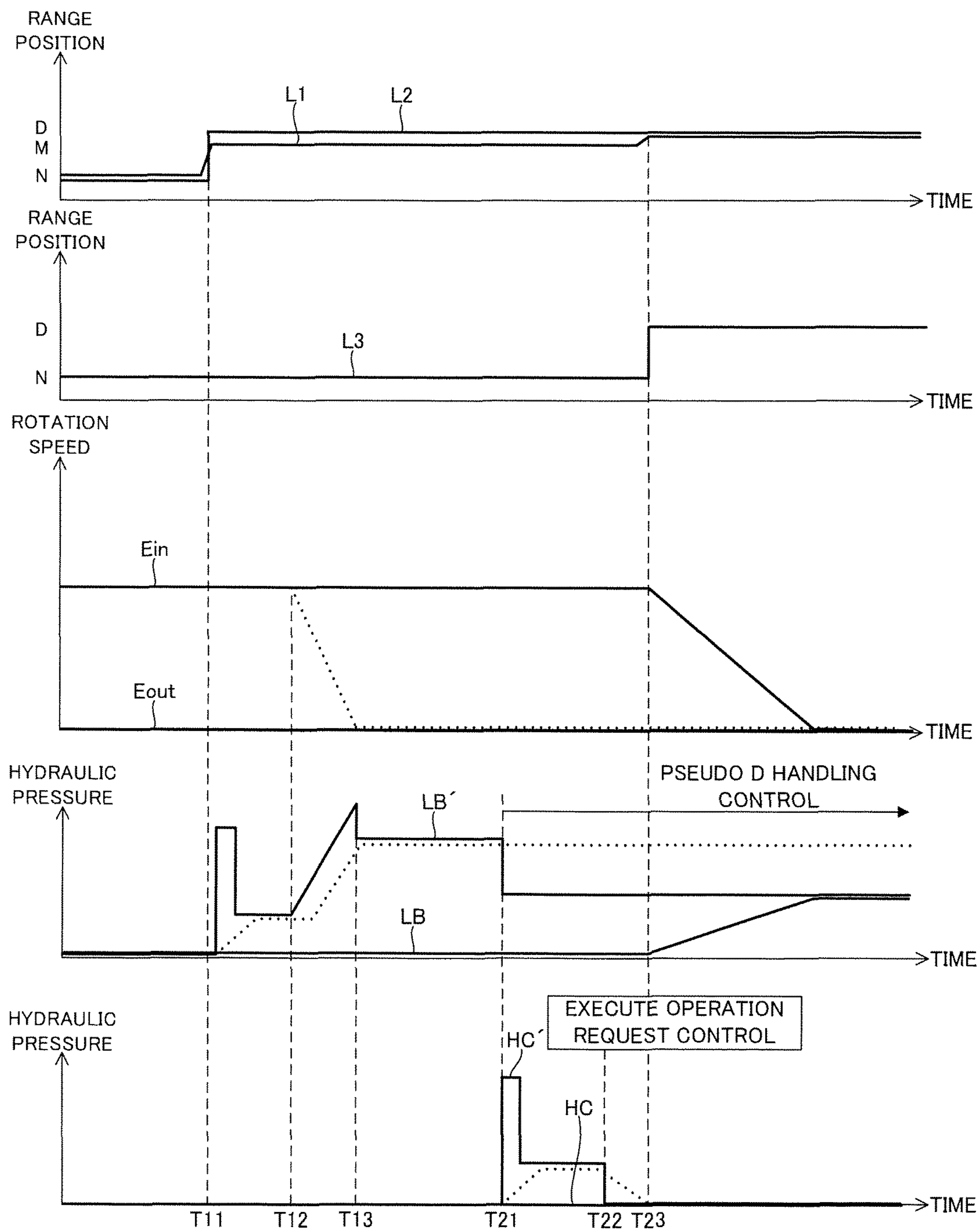
FIG. 6 is a drawing illustrating a first timing chart.

FIG. 6 is a drawing illustrating a first timing chart. FIG. 6 illustrates changes in various parameters according to the control of the controller 50 and illustrates one example of the change in the case where the cause of the delay of engagement of the first friction element 13 is the pseudo D state. The first timing chart corresponds to the case of the negative determination at Step S6 in the flowchart shown in FIG. 2. In addition to the parameters similar to FIG. 3 and FIG. 4, FIG. 6 additionally shows an actual hydraulic pressure HC and the hydraulic pressure instruction value HC'. The actual hydraulic pressure HC shows the actual hydraulic pressure of the supplied hydraulic pressure to the second friction element 14.

The changes in the various parameters from the timing T11 to the timing T13 are similar to the case of FIG. 3. In view of this, while the hydraulic pressure instruction value LB' changes by the first hydraulic pressure control, the actual hydraulic pressure LB and the converted input side rotation speed Ein do not change. Consequently, the first friction element 13 is determined as not being operated.

At a timing T21 after the timing T13, the pseudo D handling control is started. The second hydraulic pressure control is also started at the timing T21. Consequently, the hydraulic pressure instruction value HC' increases. As the hydraulic pressure instruction value HC' at this time, the hydraulic pressure instruction value at the precharge phase is applied.

The actual hydraulic pressure HC does not increase according to the hydraulic pressure instruction value HC'. In view of this, the second friction element 14 is determined as not being operated. At a timing T22, a predetermined period has passed after the determination that the second friction element 14 is not operated. Consequently, the second hydraulic pressure control is canceled and the hydraulic pressure instruction value HC' is zeroed. At the timing T22, the operation request control is also executed.

Afterwards, the operation of the select lever 1 sets the lever operation position L1 and the valve driving position L3 to the D range position at a timing T23. Consequently, together with the increase in the actual hydraulic pressure LB, the converted input side rotation speed Ein is synchronized with the output side rotation speed Eout.

Figure 7:
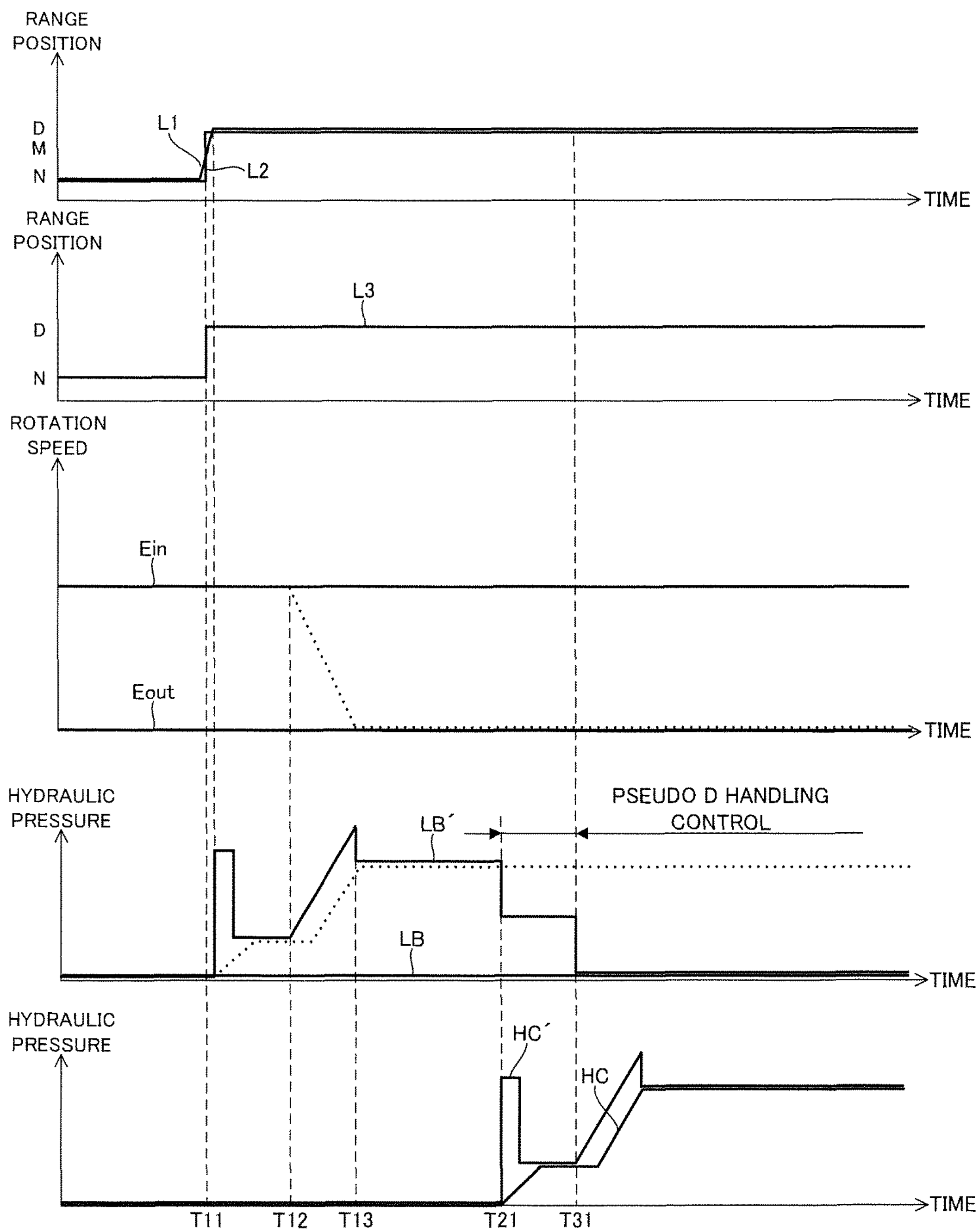
FIG. 7 is a drawing illustrating a second timing chart.

FIG. 7 is a drawing illustrating a second timing chart. FIG. 7 illustrates changes in various parameters according to the control of the controller 50 and illustrates one example of the change in the case where the cause of the delay of engagement of the first friction element 13 is the failure in the first SOL 15. The second timing chart corresponds to the case of the positive determination at Step S6 in the flowchart shown in FIG. 2.

The changes in the various parameters from the timing T11 to the timing T13 are similar to the case of FIG. 4. In view of this, while the hydraulic pressure instruction value LB' changes by the first hydraulic pressure control, the actual hydraulic pressure LB and the converted input side rotation speed Ein do not change. Consequently, the first friction element 13 is determined as not being operated.

Similar to the case of FIG. 6, at the timing T21, the pseudo D handling control and the second hydraulic pressure control are executed. However, in this example, since the second SOL 16 is normal, the increase in the hydraulic pressure instruction value HC' by the second hydraulic pressure control increases the actual hydraulic pressure HC according to this. Consequently, the second friction element 14 is determined as operated. Accordingly, the first friction element 13 is determined to have a failure.

At a timing T31 after the timing T21, the pseudo D handling control is canceled according to the determination result. The second hydraulic pressure control is executed up to the engagement phase from the timing T31. Consequently, the hydraulic pressure instruction value HC' becomes the hydraulic pressure instruction value at the engagement phase through the hydraulic pressure instruction value at the engagement progress phase and the actual hydraulic pressure HC increases according to the hydraulic pressure instruction value HC'.

The following describes main actions and effects of the control apparatus 100 of this embodiment.

The control apparatus 100 includes the select lever 1 (operation means, for example), the inhibitor switch 2 (detecting means, for example), the manual valve 3, the first SOL 15, the second SOL 16, and the controller 50 (control means, for example).

When the inhibitor switch 2 detects the D range, the controller 50 controls the first SOL 15 and the second SOL 16 such that the hydraulic pressure is supplied to the first friction element 13 and the second friction element 14. When the inhibitor switch 2 detects the D range, the determination is executed as follows. That is, in the case where the operations of all friction elements of the first friction element 13 and the second friction element 14 are not detected, the lever operation position L1 is determined to be at the intermediate position M. In the case where the operation of the first friction element 13, a part of the friction elements of the first friction element 13 and the second friction element 14, is not detected, the first SOL 15 is determined to have a failure.

The control apparatus 100 with the configuration executes the determination on the basis of the operation states of the first friction element 13 and the second friction element 14, which differ depending on the cause of the delay of engagement, at the detection of the traveling range, thereby ensuring the early detection of the cause of the delay of engagement.

When the inhibitor switch 2 detects the D range, the controller 50 controls the first SOL 15 and the second SOL 16 such that the hydraulic pressure is supplied to the first friction element 13 and the hydraulic pressure is supplied to the second friction element 14 after the detection of the operation of the first friction element 13 is executed.

This does not interlock the automatic transmission 10 until the detection of the operation of the first friction element 13 is executed, thereby ensuring the smooth start of moving using the first friction element 13 in the case where the first friction element 13 does not cause the delay of engagement.

In the case where the operation of the first friction element 13 is not detected, the controller 50 controls the first SOL 15 and the second SOL 16 such that the vehicle starts moving by the second friction element 14.

Accordingly, even if the first SOL 15 has the failure, the vehicle can start moving while reducing giving an uncomfortable feeling due to such as a delay of the start of moving to the driver, thereby ensuring reducing deterioration of drive ability.

When the controller 50 continuously determines that the state is in the pseudo D state until the elapse of the predetermined period, the friction element that executes the control for start of moving may be changed from the first friction element 13 to the second friction element 14.

This allows the start of moving at the gear ratio different from the gear ratio during the normal when the pseudo D state is solved, specifically, the gear ratio higher than the gear ratio the during normal. By the irregular start of moving, the fact that an inappropriate operation of the select lever 1 has been made is notified to the driver. This ensures calling the driver's attention so as not to cause the inappropriate operation at and after that.

Second Embodiment

The control apparatus 100 of this embodiment is substantially identical to the control apparatus 100 according to the first embodiment except that the controller 50 is configured as described below.

Figure 8:
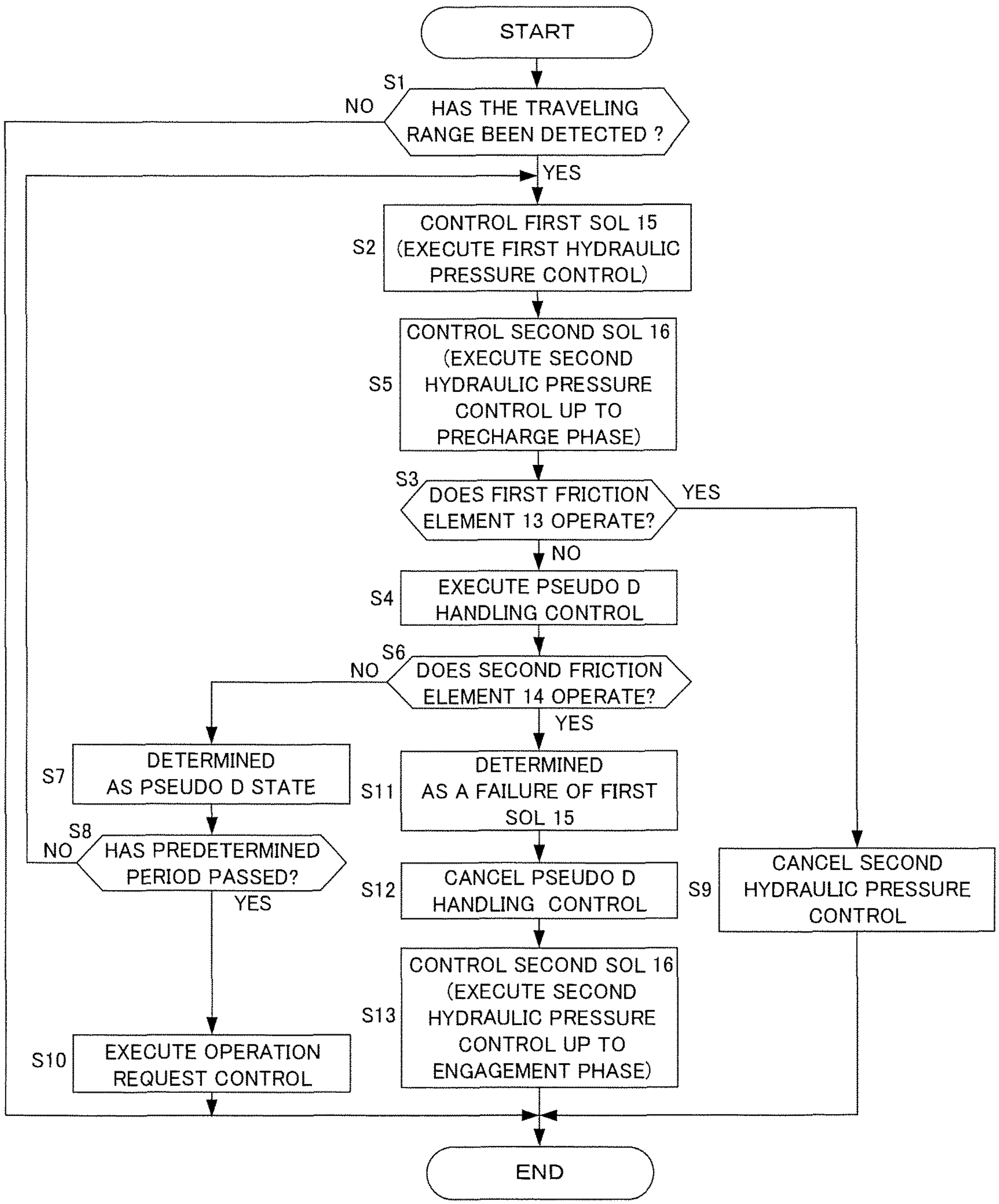
FIG. 8 is a drawing of a flowchart showing an example of a control executed in a second embodiment.

FIG. 8 is a drawing of a flowchart showing an example of the control executed in this embodiment. This flowchart is identical to the flowchart shown in FIG. 2 except for the points described below.

In this embodiment, the controller 50 executes the process at Step S5 continuous with Step S2 to execute the process at Step S5 before Step S3. Accordingly, the first SOL 15 and the second SOL 16 are controlled such that the hydraulic pressure is supplied to the first friction element 13 when the inhibitor switch 2 detects the D range and the hydraulic pressure is supplied to the second friction element 14 before the detection of the operation of the first friction element 13 is executed. The process at Step S5 may be executed simultaneously with the process at Step S2.

Further in this embodiment, with the positive determination at Step S8, the controller 50 does not cancel the second hydraulic pressure control but advances the process to Step S10 and returns the process to Step S2. Afterwards, with the positive determination at Step S3, the process at Step S9 is executed.

Accordingly, in this embodiment, even if the controller 50 determines that the state is the pseudo D state at Step S7, the controller 50 continues the second hydraulic pressure control until the operation of the first friction element 13 is detected. The processes of this flowchart are terminated after Step S9.

Figure 9:
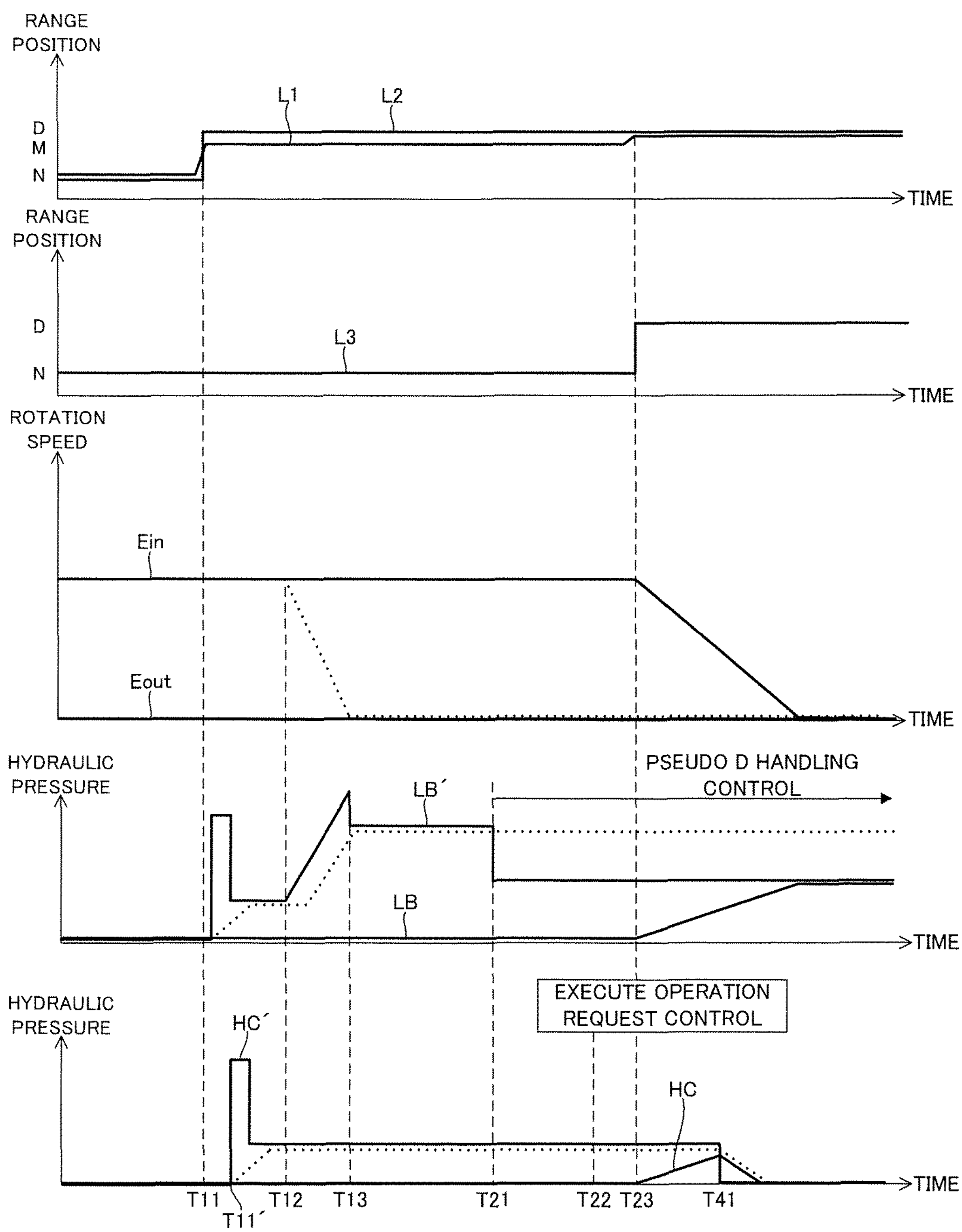
FIG. 9 is a drawing illustrating a third timing chart.

FIG. 9 is a drawing illustrating a third timing chart. FIG. 9 illustrates changes in various parameters according to the control of the controller 50 and illustrates one example of the change in the case where the cause of the delay of engagement of the first friction element 13 is the pseudo D state. The third timing chart corresponds to the case of the negative determination at Step S6 in the flowchart shown in FIG. 8.

Similar to FIG. 6 and FIG. 7, the first hydraulic pressure control is started at the timing T11. The second hydraulic pressure control is started at a timing T11', which is after the timing T11 and before the timing T12. Since being the pseudo D state, the actual hydraulic pressure LB and the actual hydraulic pressure HC do not increase by the first hydraulic pressure control and the second hydraulic pressure control. The detection of the operation of the first friction element 13 is executed after the timing T11' and before the timing T21 and the first friction element 13 is determined as not being operated. Consequently, the pseudo D handling control is executed at the timing T21.

The actual hydraulic pressure HC does not increase according to the hydraulic pressure instruction value HC'. In view of this, the second friction element 14 is determined as not being operated and is determined as being in the pseudo D state. Then, the operation request control is executed at the timing T22 after an elapse of a predetermined period from the determination. The lever operation position L1 and the valve driving position L3 become the D range position at the timing T23.

The actual hydraulic pressure LB increases from the timing T23, and the converted input side rotation speed Ein is synchronized with the output side rotation speed Eout. While the actual hydraulic pressure HC also increases, as a result of the determination of the operation of the first friction element 13, the second hydraulic pressure control is canceled at a timing T41 after the timing T23, and the hydraulic pressure instruction value HC' is zeroed. Consequently, the actual hydraulic pressure HC is zeroed according to this.

The following describes main actions and effects of the control apparatus 100 of this embodiment.

With the control apparatus 100 of this embodiment, the controller 50 controls the first SOL 15 and the second SOL 16 such that the hydraulic pressure is supplied to the first friction element 13 when the inhibitor switch 2 detects the D range and the hydraulic pressure is supplied to the second friction element 14 before the detection of the operation of the first friction element 13 is executed.

The control apparatus 100 with the configuration achieves the hydraulic pressure supply to the second friction element 14 without waiting for the detection of the operation of the first friction element 13, thereby ensuring the early detection of the operation of the second friction element 14 by the amount. This makes it possible to detect the cause of the delay of engagement of the first friction element 13 early by the amount.

The control apparatus 100 with the configuration simultaneously causes the hydraulic pressure to act on the first friction element 13 and the second friction element 14 during the normal, thereby ensuring interlocking the automatic transmission 10. This ensures preventing the vehicle from retreating at the start of moving on an uphill road. That is, this ensures enhancing the safety at the start of moving on the uphill road.

Similar to the case of the first embodiment, in the case where the controller 50 continuously determines that the state is in the pseudo D state until the elapse of the predetermined period, the controller 50 may change the friction element that executes the control for start of moving from the first friction element 13 to the second friction element 14. This, as described in the first embodiment, ensures calling the driver's attention so as not to cause the inappropriate operation.

Such change in friction element is executable by executing the processes similar to the processes at Step S12 and Step S13 subsequent to the positive determination at Step S8. In this case, the operation request control may not be executed at Step S10. In this case, after the process similar to the process at Step S13 is executed, the processes of this flowchart can be terminated.

The embodiments of the present invention described above are merely illustration of some application examples of the present invention and not of the nature to limit the technical scope of the present invention to the specific constructions of the above embodiments.

Figure 10:
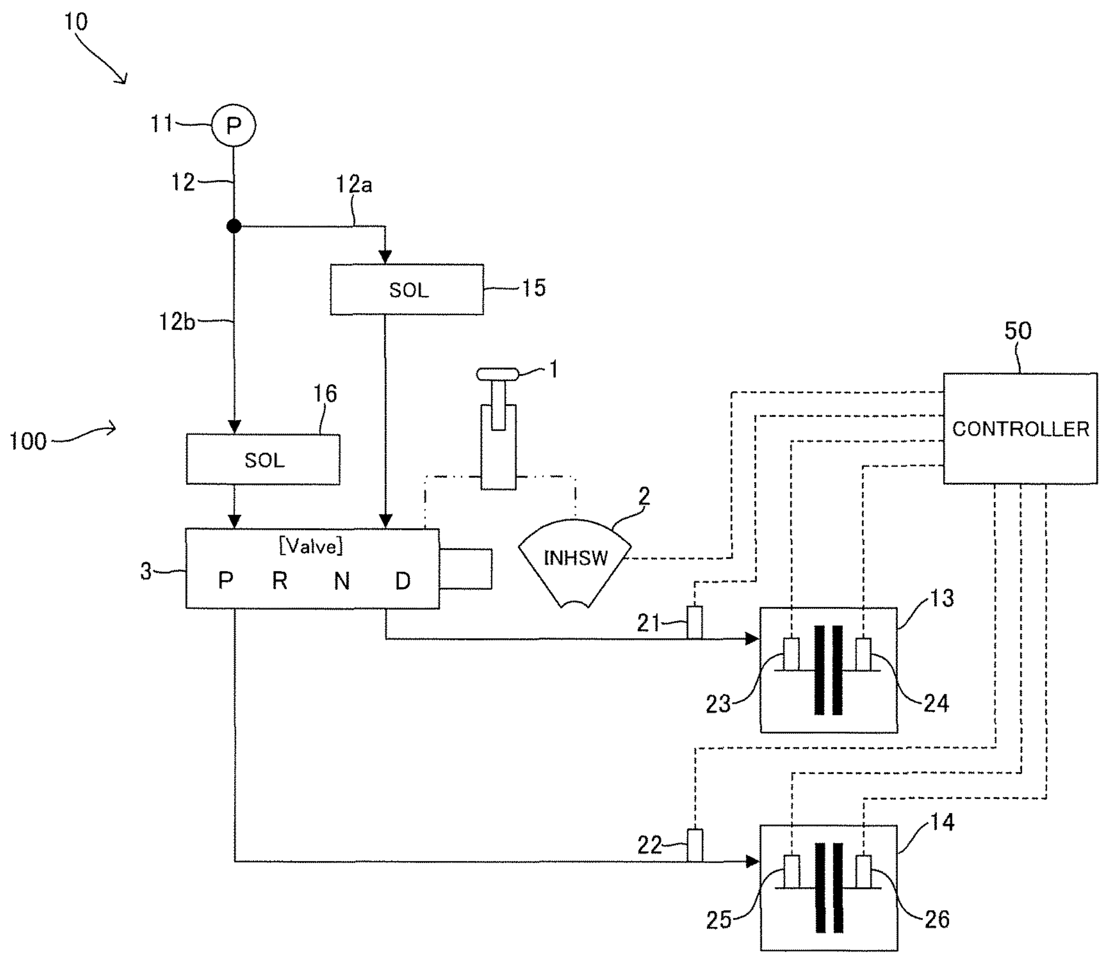
FIG. 10 is a drawing showing a modification of a control apparatus for automatic transmission.

The above-described embodiments describe the case where the manual valve 3 is disposed upstream with respect to the first SOL 15 and the second SOL 16 at the oil passage 12. However, as illustrated in FIG. 10, the manual valve 3 may be disposed downstream with respect to the first SOL 15 and the second SOL 16 at the oil passage 12.

In this case, the manual valve 3 is disposed at the first branch oil passage 12*a* and the second branch oil passage 12*b*. The first branch oil passage 12*a* and the second branch oil passage 12*b* are opened during the selection of the traveling range and are cut off during the selection of the non-traveling range.

The above-described embodiments describe the case where the first friction element 13 is equivalent to the one friction element. This is because of the following reason. From an aspect of handling the delay of engagement of the friction element at the start of moving, regarding it as normal if the operation of the first friction element 13 is detected and omitting the detection of the operation of the second friction element 14 like the above-described embodiments ensure improving startability by the amount.

However, when the operation of the first friction element 13 is detected, the controller 50 may further execute the detection of the operation of the second friction element 14. The second friction element 14 may be applied as the one friction element.

In this case as well, when the operations of neither the first friction element 13 nor the second friction element 14 is detected, it can be determined that the lever operation position L1 is at the intermediate position M. In the case where the operation of any one of the friction elements of the first friction element 13 and the second friction element 14 is not detected, it can be determined that the hydraulic pressure controller constituted of the first SOL 15 and the second SOL 16 has a failure.

The present application claims a priority based on Japanese Patent Application No. 2015-21477 filed with the Japan Patent Office on Feb. 5, 2015, all the contents of which are hereby incorporated by reference.

The invention claimed is:

1. A control apparatus for automatic transmission, comprising:
- an select lever structured to permit selection of a range of an automatic transmission including a traveling range and a non-traveling range;
- a detecting sensor configured to detect the range selected via the select lever;
- a valve disposed at an oil passage that couples a hydraulic pressure supply source and a plurality of forward movement friction elements, a supply of a hydraulic pressure from the hydraulic pressure supply source to the plurality of forward movement friction elements being allowed while the traveling range is selected, the valve being configured to be driven according to an operation of the select lever;
- a plurality of solenoids disposed at the oil passage, the plurality of solenoids being configured to control the supplied hydraulic pressure to the plurality of forward movement friction elements; and
- a controller configured such that
  - when the detecting sensor detects the traveling range, the controller controls the plurality of solenoids to supply the plurality of forward movement friction elements with the hydraulic pressure, and
  - when the detecting sensor detects the traveling range, the controller executes a determination such that
    - when operations of all the friction elements of the plurality of forward movement friction elements are not detected, the controller determines, as the determination, that an operation position of the select lever is at an intermediate position between a position according to the traveling range and a position according to the non-traveling range, and
  - when operation of a part of the friction elements among the plurality of forward movement friction elements is not detected, the controller determines, as the determination, that a failure is present among the plurality of solenoids.

2. The control apparatus for automatic transmission according to claim 1, wherein
- the controller is configured to control the plurality of solenoids such that the hydraulic pressure is supplied to one friction element when the detecting sensor detects the traveling range, the one friction element being any one of the plurality of forward movement friction elements, and the hydraulic pressure is supplied to another friction element other than the one friction element among the plurality of forward movement friction elements after a detection of an operation of the one friction element is executed.

3. The control apparatus for automatic transmission according to claim 1, wherein the controller is configured to control the plurality of the solenoids such that the hydraulic pressure is supplied to one friction element when the detecting sensor detects the traveling range, the one friction element being any one of the plurality of forward movement friction elements, and the hydraulic pressure is supplied to another friction element other than the one friction element among the plurality of forward movement friction elements before a detection of an operation of the one friction element is executed.

4. The control apparatus for automatic transmission according to claim 1, wherein the controller is configured such that when the operation of the part of the friction elements is not detected, the controller controls the plurality of solenoids to execute a start of movement of the vehicle using another friction element other than the part of the friction elements among the plurality of forward movement friction elements.

5. The control apparatus for automatic transmission according to claim 1, wherein the controller is configured such that when the controller continuously determines that the operation position of the select lever is at the intermediate position until a predetermined time period has elapsed, the controller changes one friction element which is among the plurality of forward movement friction elements and which is used for a start of movement of the vehicle, the controller being configured to change the friction element from the one friction element to another friction element, each of the one friction element and the another friction element other than the one friction element being any one of the plurality of forward movement friction elements.

6. A control method for automatic transmission comprising:

providing a select lever, a detecting sensor, a valve, and a plurality of solenoids, the select lever being used to select a range of an automatic transmission including a traveling range and a non-traveling range, the detecting sensor being configured to detect the range selected via the select lever, the valve being disposed at an oil passage that couples a hydraulic pressure supply source and a plurality of forward movement friction elements, a supply of a hydraulic pressure from the hydraulic pressure supply source to the plurality of forward movement friction elements being allowed while the traveling range is selected, the valve being configured to be driven according to an operation of the select lever, the plurality of solenoids being disposed at the oil passage, the plurality of solenoids being configured to control the supplied hydraulic pressure to the plurality of forward movement friction elements;

controlling the plurality of solenoids such that when the detecting sensor detects the traveling range, the plurality of solenoids supplies the plurality of forward movement friction elements with the hydraulic pressure; and determining, when the detecting sensor detects the traveling range and operations of all the friction elements of the plurality of forward movement friction elements are not detected, that an operation position of the select lever is at an intermediate position between a position according to the traveling range and a position according to the non-traveling range, and determining, when the detecting sensor detects the traveling range and the operation of a part of the friction elements among the plurality of forward movement friction elements is not detected, that a failure is present among the plurality of solenoids.

7. A control apparatus for automatic transmission, comprising:

operating means for selecting a range of an automatic transmission including a traveling range and a non-traveling range;

detecting means for detecting the range selected via the operating means;

a valve disposed at an oil passage that couples a hydraulic pressure supply source and a plurality of forward movement friction elements, a supply of a hydraulic pressure from the hydraulic pressure supply source to the plurality of forward movement friction elements being allowed while the traveling range is selected, the valve being configured to be driven according to an operation of the operating means;

a hydraulic pressure controller disposed at the oil passage, the hydraulic pressure controller being configured to control the supplied hydraulic pressure to the plurality of forward movement friction elements;

control means for controlling the hydraulic pressure controller to supply the plurality of forward movement friction elements with the hydraulic pressure when the detecting means detects the traveling range, and for executing a determination when the detecting means detects the traveling range, the control means being configured such that when operations of all the friction elements of the plurality of forward movement friction elements are not detected, the control means determines that an operation position of the operating means is at an intermediate position between a position according to the traveling range and a position according to the non-traveling range, and when the operation of a part of the friction elements among the plurality of forward movement friction elements is not detected, the control means determines that the hydraulic pressure controller has a failure.

* * * * *